United States Patent [19]
Hibiske

[11] Patent Number: 5,681,133
[45] Date of Patent: Oct. 28, 1997

[54] FORM INSERT TOOLHOLDER ASSEMBLY

[75] Inventor: Timothy A. Hibiske, Hoagland, Ind.

[73] Assignee: Aeroquip Corporation, Maumee, Ohio

[21] Appl. No.: 544,297

[22] Filed: Oct. 17, 1995

[51] Int. Cl.⁶ .................................. B32B 27/06
[52] U.S. Cl. ................ 407/102; 407/105; 407/107
[58] Field of Search ........................ 407/47, 101, 102, 407/103, 104, 105, 106, 107

[56] References Cited

U.S. PATENT DOCUMENTS

| | | | |
|---|---|---|---|
| 3,002,405 | 10/1961 | Heftler | 407/107 X |
| 3,102,326 | 9/1963 | Conti et al. | 407/101 X |
| 4,001,925 | 1/1977 | Eriksson | 407/107 |
| 4,631,993 | 12/1986 | Kelm | 407/101 X |
| 4,979,849 | 12/1990 | Kerzran | 407/107 |

*Primary Examiner*—Daniel W. Howell
*Assistant Examiner*—Henry W. H. Tsai
*Attorney, Agent, or Firm*—Emch, Schaffer, Schaub & Porcello Co., L.P.A.

[57] ABSTRACT

A form insert toolholder assembly including a toolholder having a base. The base includes a base inclined surface having an outer edge and an inner edge. The base further includes a clamp receiving portion having top wall, a first side wall and a second side wall. The top wall defines a clamp receiving portion opening. The inner edge and the first side wall define an insert pocket. A pin is positioned on the base inclined surface between the outer edge and the inner edge. The assembly further includes a clamp having an upper surface and a lower surface. The clamp defines a clamp opening extending from the upper surface to the lower surface. The lower surface has a clamp inclined surface that is parallel to the base inclined surface. The assembly further includes an insert having a cutting edge, a mounting edge, a first end, a second end, a base surface and a clamp surface. The insert is mounted between the base and the clamp wherein the mounting edge is positioned adjacent the insert pocket, the first end is positioned adjacent the pin, the base surface is positioned adjacent the base inclined surface, and the clamp surface is positioned adjacent the clamp inclined surface. The assembly includes a fastening device extending through the clamp receiving portion opening and the clamp opening to attach the clamp to the base to secure the insert between the clamp and the base.

6 Claims, 4 Drawing Sheets

FORM INSERT TOOLHOLDER ASSEMBLY

BACKGROUND OF THE INVENTION

The present invention is directed to a form insert toolholder assembly. More specifically, the invention is directed to a form insert toolholder assembly having a form insert positioned between a base and a clamp.

Form insert toolholder assemblies are known in the art. These types of assemblies are used to form a contour along the length of a rotating workpiece. These assemblies are commonly used on multispindle bar machines. The assembly is mounted on a tool slide that moves the cutting edge of the insert into the rotating workpiece, dwells and then retracts to its original starting position.

It has been found that there is a need for a form insert toolholder assembly that is one piece. It has also been found that there is a need for an assembly that accurately positions and maintains an insert on the base of the assembly. Further, there is a need for a form insert toolholder assembly that allows for the efficient replacement of an insert in the assembly.

The present invention satisfies the above-identified needs. The form insert toolholder assembly of the present invention provides a new and useful one-piece assembly.

SUMMARY OF THE INVENTION

The present invention is directed to a form insert toolholder assembly that includes a toolholder having a base. The base includes a base inclined surface having an outer edge and an inner edge. The base further includes a clamp receiving portion having a top wall, a first side wall and a second side wall. The top wall defines a clamp receiving portion opening. The inner surface and the first side wall define an insert pocket. A pin is positioned on the base inclined surface substantially between the outer edge and the inner edge.

The assembly includes a clamp having an upper surface and a lower surface. The clamp defines a clamp opening extending from the upper surface to the lower surface. The lower surface has a clamp inclined surface that is parallel to the base inclined surface.

The assembly includes an insert having a cutting edge, a mounting edge, a first end, a second end, a base surface and a clamp surface. The insert is mounted between the base and the clamp wherein the mounting edge is positioned adjacent the insert pocket, the first end is positioned adjacent the pin, the base surface is positioned adjacent the base inclined surface, and the clamp surface is positioned adjacent the clamp inclined surface.

The assembly includes a fastening device, such as a screw, that extends through the clamp receiving portion opening and the clamp opening. The fastening device attaches the clamp to the base to secure the insert.

It is the primary object of the present invention to provide a one-piece form insert toolholder assembly having a base, a clamp and an insert that accurately positions and maintains the insert within the assembly.

Other objects and advantages of the present invention will become apparent to those skilled in the art upon a review of the accompanying drawings and the following detailed description of the preferred embodiments of the invention.

DETAILED DESCRIPTION OF THE PREFERRED EMBODIMENTS

Figure 1:
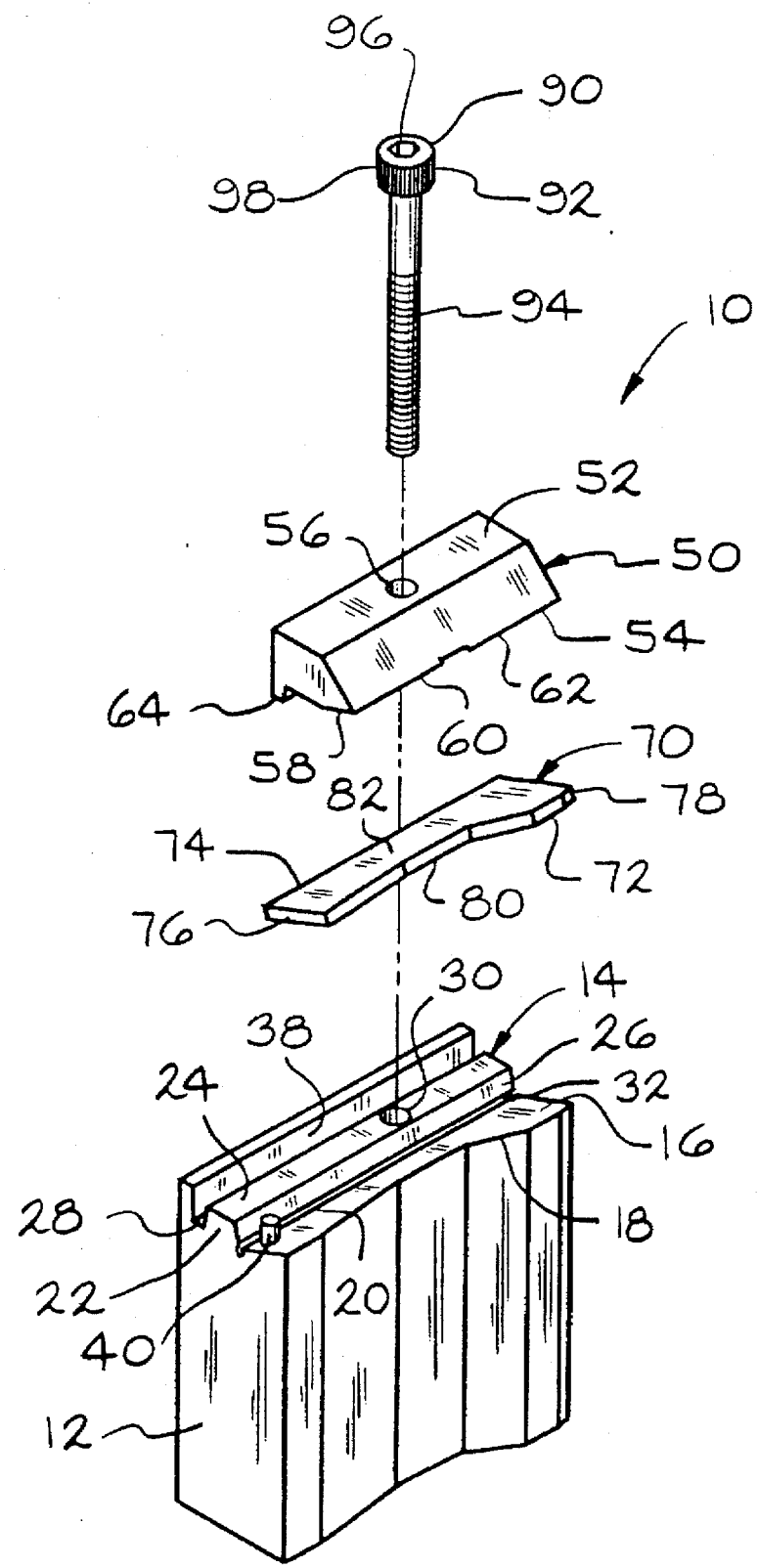
FIG. 1 is an exploded view of a first embodiment of the form insert toolholder assembly of the present invention showing the base, insert, clamp and fastening device.

The preferred embodiments and best mode of the present invention will now be described in detail with reference to the drawings. The form insert toolholder assembly of the present invention is indicated generally in the drawings by the reference number 10. The assembly 10 includes a toolholder 12 having a base 14. The base 14 includes a base inclined surface 16 having an outer edge 18 and an inner edge 20. The base 14 further includes a clamp receiving portion 22 having a top wall 24, a first side wall 26 and a second side wall 28. The top wall 24 defines a clamp receiving portion opening 30.

Figure 2:
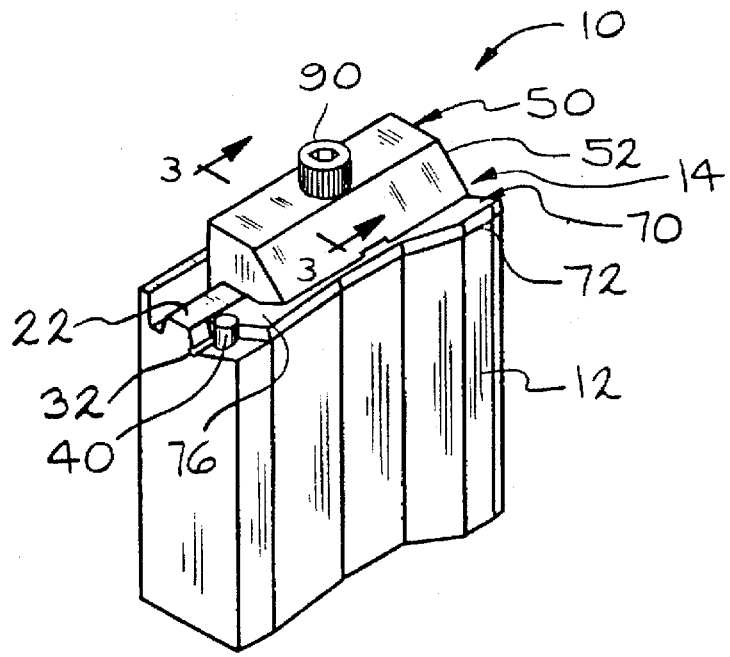
FIG. 2 is a perspective view of the first embodiment of the present invention.
Figure 3:
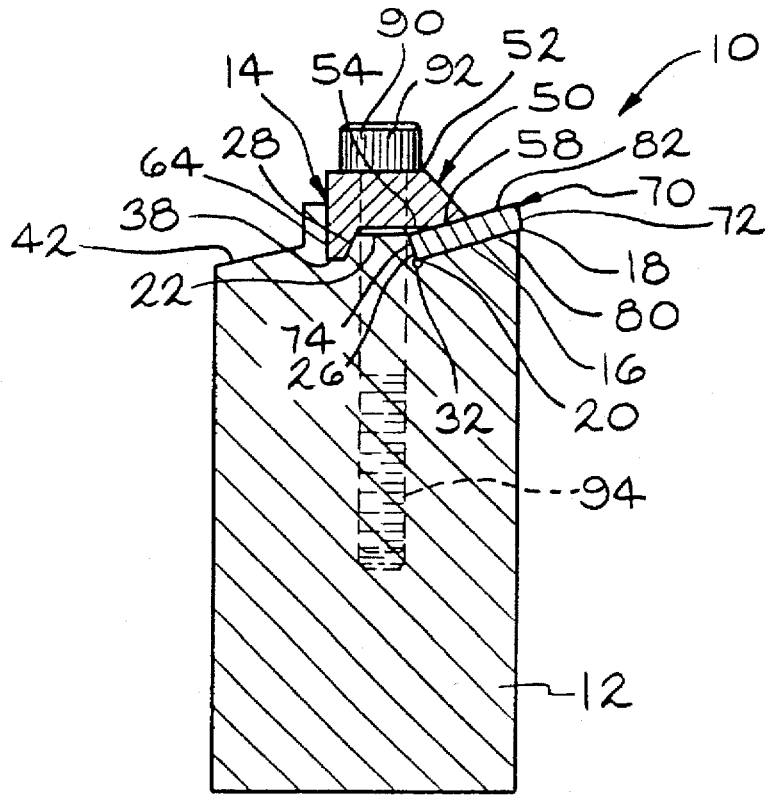
FIG. 3 is a cross-sectional view of the first embodiment of the present invention taken along line 3—3 of FIG. 2.
Figure 4:
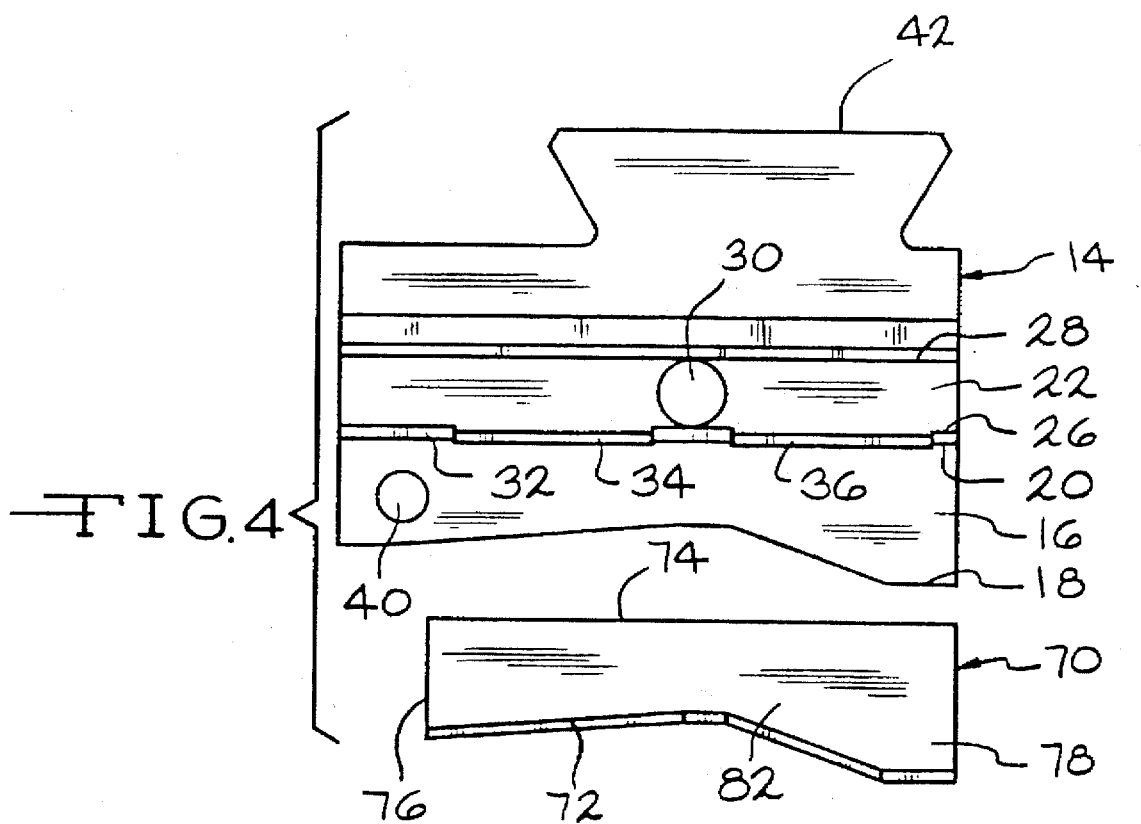
FIG. 4 is a top view of the base of the first embodiment of the toolholder and the insert.

Referring to FIGS. 1, 3 and 4, the inner edge 20 of the base inclined surface 16 and the first side wall 26 of the clamp receiving portion 22 define a longitudinally extending insert pocket 32. As shown in FIG. 4, the insert pocket 32 includes a first pocket pad 34 and a second pocket pad 36. The pocket pads 34 and 36 extend outwardly from the base 14 in spaced relationship. The clamp receiving portion opening 30 is positioned between the first and second pocket pads 34 and 36. As shown in FIGS. 1 and 2, the base 14 further includes a longitudinally extending clamp receiving channel 38 adjacent the second side wall 28 of the clamp receiving portion 22.

Referring to FIGS. 1, 2 and 4, a pin 40 is positioned on the base inclined surface 16 between the outer edge 18 and the inner edge 20. The pin 40 is fixedly attached to the base inclined surface 16.

As shown in FIGS. 3 and 4, the toolholder 12 can include an integral slot mounting member 42. The mounting member 42 can be inserted into a mating slide (not shown) to allow for movement of the form insert toolholder assembly 10 with respect to a workpiece.

Figure 6:
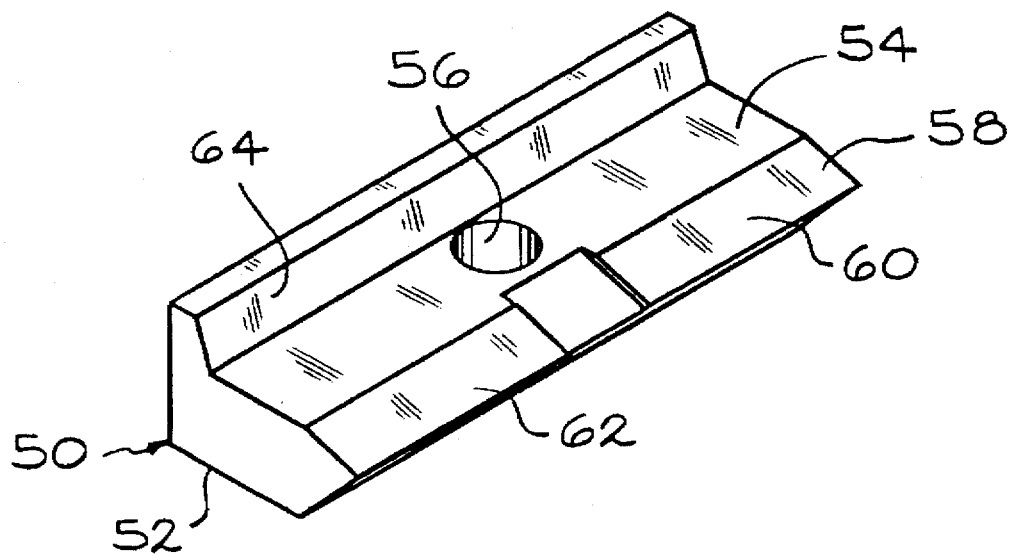
FIG. 6 is a perspective view showing the lower surface of the first embodiment clamp of the present invention.

Referring to FIGS. 1 and 6, the form insert toolholder assembly 10 of the present invention includes a clamp 50 having an upper surface 52 and a lower surface 54. The clamp 50 defines a clamp opening 56 that extends from the upper surface 52 to the lower surface 54. As shown in FIGS. 3 and 6, the lower surface 54 has a clamp inclined surface 58 that is parallel to the base inclined surface 16. As shown in FIG. 6, the clamp inclined surface 58 includes a first clamp pad 60 and a second clamp pad 62. The first and second clamp pads 60 and 62 extend outwardly from the lower surface 54 of the clamp 50 in spaced relationship. The clamp opening 56 is positioned between the first and second clamp pads 60 and 62.

Referring to FIGS. 1, 3, and 6, the clamp 50 includes an integral base alignment portion 64 that extends outwardly from the lower surface 54 of the clamp 50. The base alignment portion 64 is received by the clamp receiving channel 38.

Figure 5:
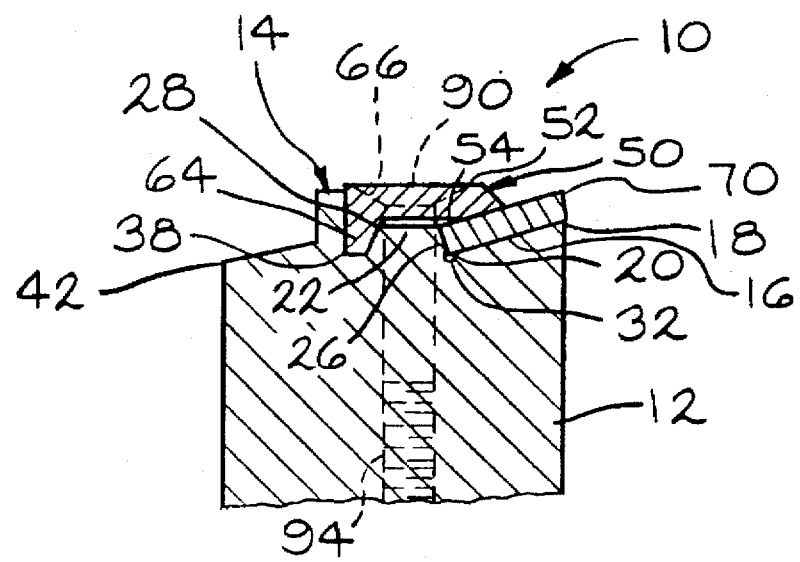
FIG. 5 is a cross-sectional view similar to the view of FIG. 3 showing a second embodiment of the present invention.

Referring to FIGS. 3 and 5, a first embodiment clamp 50 is shown in FIG. 3 and a second embodiment clamp 50 is shown in FIG. 5. The first embodiment clamp 50 includes more material between the upper surface 52 and the lower surface 54 than the second embodiment clamp 50. Therefore, the first embodiment clamp, as shown in FIG. 3, has a higher profile than the second embodiment clamp as shown in FIG. 5. Further, the second embodiment clamp as shown in FIG. 5, includes a clamp opening 56 having a recess 66. The choice of which clamp to use depends on the application for which the assembly 10 is to be utilized.

As shown in FIGS. 1 to 4, the assembly 10 further includes an insert 70 having a cutting edge 72, a mounting edge 74, a first end 76, a second end 78, a base surface 80 and a clamp surface 82. The insert 70 is mounted between the base 14 and the clamp 50. The insert 70 is mounted so that the mounting edge 74 is positioned adjacent the insert pocket 32. The first end 76 is positioned adjacent the pin 40. The base surface 80 is positioned adjacent the base inclined surface 16. Finally, the clamp surface 82 is positioned adjacent the clamp inclined surface 58. As shown in FIGS. 1, 2 and 4, the first clamp pad 60 is positioned adjacent the first end 76 of the insert 70 and the second clamp pad 62 is positioned adjacent the second end 78 of the insert 70. As shown in FIG. 4, the mounting edge 74 of the insert 70 is positioned adjacent the first and second pocket pads 34 and 36. The first pocket pad 34 is adjacent the first end 76 of the insert 70 and the second pocket pad 36 is positioned adjacent the second end 78 of the insert 70. As shown in FIGS. 1 and 4, the cutting edge 72 of the insert 70 includes a predetermined shape for forming articles. The cutting edge 72 can be comprised of a variety of shapes depending on the application.

Referring to FIGS. 1 to 4, the assembly 10 of the present invention can include a fastening device, such as a clamp screw 90. As shown in FIG. 1, the clamp screw 90 can include a head 92 and a threaded body 94. The head 92 can include a recess 96 for receiving various tightening tools, such as a hex wrench. The head 92 can also include a rough surface 98 that can be used to provide friction contact for the fingers of a person who is constructing the assembly 10. As shown in FIGS. 1 and 3, the body 94 of the clamp screw 90 extends through the clamp opening 56 and into the clamp receiving portion opening 30. The clamp receiving portion opening 30 includes mating threads for receiving the threads on the body 94 of the clamp screw 90. The clamp screw 90 attaches the clamp 50 to the base 14 of the toolholder 12. The insert 70 is secured between the clamp 50 and the base 12 as previously described. The toolholder 12, clamp 50, insert 70 and clamp screw 90 can each be made of metal, preferably of steel.

The form insert toolholder assembly 10 of the present invention has many advantages. For example, the first and second pocket pads 34 and 36 and the pin 40 cooperate to correctly position the insert 70 with respect to the base 14. The first and second pocket pads 34 and 36 and the pin 40 engage the mounting edge 74 and the first end 76 of the insert 70, respectively, to accurately position the insert 70. Another advantage of the present invention is that the parallel inclined surfaces 16 and 58 of the base 14 and the clamp 50, respectively, cause rearward clamp movement as the clamp screw 90 is tightened. This clamp movement seats the insert 70 onto the first and second pocket pads 34 and 36. Another example advantage is that the first and second clamp pads 60 and 62 apply force on the clamp surface 82 of the insert 70. The force is applied in the areas adjacent the first and second ends 76 and 78 of the insert 70 and not in the space between the ends. This allows the insert 70 to be firmly maintained within the assembly 10. Finally, the clamp 50 can be attached to the base 14 by a single clamp screw 90. This allows the clamp 50 to be located evenly with respect to the base 14. It also allows equal force to be applied by the first and second clamp pads 60 and 62 on the insert 70. The single clamp screw 90 also allows a person to position the insert 70 in the insert pocket 32 with one hand and tighten the single clamp screw with the other hand.

The invention has been described with reference to the presently preferred embodiments thereof. It should be apparent that various changes may be made therein without departing from the true spirit of the invention.

I claim:

1. A form insert toolholder assembly comprising:

a toolholder having a base, said base including a base inclined surface having an outer edge and an inner edge, said base further including a clamp receiving portion having a top wall, a first side wall and a second side wall, said top wall defining a clamp receiving portion opening, said inner edge and said first side wall defining an insert pocket including first and second pocket pads extending outwardly from said base in spaced relationship, said clamp receiving portion opening being positioned substantially between said pocket pads;

a pin positioned on said base inclined surface substantially between said outer edge and said inner edge;

a clamp having an upper surface and a lower surface, said clamp defining a clamp opening extending from said upper surface to said lower surface, said lower surface having a clamp inclined surface including first and second clamp pads extending outwardly from said clamp in spaced relationship substantially parallel to said base inclined surface, said clamp opening being positioned substantially between said clamp pads;

an insert having a cutting edge, a mounting edge, a first end, a second end, a base surface and a clamp surface, said insert being mounted between said base and said clamp wherein said mounting edge is positioned adjacent said insert pocket, said first end is positioned adjacent said pin, said base surface is positioned adjacent said base inclined surface, and said clamp surface is positioned adjacent said clamp inclined surface; and a single clamp screw extending through said clamp receiving portion opening and said clamp opening to attach said clamp to said base to secure said insert between said clamp and said base.

2. The form insert toolholder assembly of claim 1, wherein said first pocket pad is positioned adjacent said first end of said insert and said second pocket pad is positioned adjacent said second end of said insert.

3. The form insert toolholder assembly of claim 1, wherein said base further includes a longitudinally extending clamp receiving channel adjacent said second side wall of said clamp receiving portion.

4. The form insert toolholder assembly of claim 3, wherein said clamp further includes a base alignment portion extending outwardly from said lower surface of said clamp, said base alignment portion being received by said clamp receiving channel.

5. The form insert toolholder assembly of claim 1, wherein said first clamp pad is positioned adjacent said first end of said insert and said second clamp pad is positioned adjacent said second end of said insert.

6. The form insert toolholder assembly of claim 1, wherein said cutting edge of said insert includes a predetermined shape for forming articles.

* * * * *

UNITED STATES PATENT AND TRADEMARK OFFICE
CERTIFICATE OF CORRECTION

PATENT NO. : 5,681,133
DATED : October 28, 1997
INVENTOR(S) : Timothy A. Hibiske It is certified that error appears in the above-identified patent and that said Letters Patent is hereby corrected as shown below:

Col. 4, line 18, delete "wail" and insert --wall--.

Signed and Sealed this

Twenty-fourth Day of February, 1998

Attest:

BRUCE LEHMAN

*Attesting Officer*    *Commissioner of Patents and Trademarks*